US008787592B2

(12) United States Patent
Yoshino

(10) Patent No.: US 8,787,592 B2
(45) Date of Patent: Jul. 22, 2014

(54) BOUNDARY MICROPHONE

(75) Inventor: Satoshi Yoshino, Tokyo (JP)

(73) Assignee: Kabushiki Kaisha Audio-Technica, Tokyo (JP)

( * ) Notice: Subject to any disclaimer, the term of this patent is extended or adjusted under 35 U.S.C. 154(b) by 468 days.

(21) Appl. No.: 13/116,306

(22) Filed: May 26, 2011

(65) Prior Publication Data

US 2011/0293117 A1 Dec. 1, 2011

(30) Foreign Application Priority Data

May 28, 2010 (JP) ................................ 2010-122620

(51) Int. Cl.
*H04B 15/00* (2006.01)
*H04R 3/00* (2006.01)
*H02B 1/00* (2006.01)

(52) U.S. Cl.
USPC .......................... 381/94.6; 381/111; 381/123

(58) Field of Classification Search
USPC .......... 200/511, 512; 381/91, 94.1, 94.6, 111, 381/123, 173–175
See application file for complete search history.

(56) References Cited

U.S. PATENT DOCUMENTS 6,198,060 B1 * 3/2001 Yamazaki et al. ............ 200/305

FOREIGN PATENT DOCUMENTS

JP 2008-288933 11/2008

OTHER PUBLICATIONS

"AN2869 Application Note, Guidelines for designing touch sensing applications", Feb. 2009, STMicroelectronics NV, Rev 1, pp. 1-16.*

* cited by examiner

*Primary Examiner* — Davetta W Goins
*Assistant Examiner* — Daniel Sellers
(74) *Attorney, Agent, or Firm* — Whitham Curtis Christofferson & Cook, PC

(57) ABSTRACT

A membrane pressure-sensitive switch includes a circuit board provided with an electrode pattern detecting electrical conductivity, a membrane having a conductive surface, and a spacer interposed between the membrane and the circuit board. The electrode pattern is surrounded by a ground pattern on the front surface of the circuit board. The ground pattern on the front surface is connected to another ground pattern on the rear surface of the circuit board. The spacer is composed of a conductive material. The conductive surface of the membrane, the ground pattern on the front surface of the circuit board, and the spacer are electrically conducted. The electrode pattern is disposed between the conductive surface of the membrane and the other ground pattern on the rear surface of the circuit board.

6 Claims, 8 Drawing Sheets

RELATED ART

RELATED ART

RELATED ART

RELATED ART

BOUNDARY MICROPHONE

BACKGROUND OF THE INVENTION

1. Field of the Invention

The present invention relates to a boundary microphone having a membrane pressure-sensitive switch that turns on or off an output signal of a microphone unit and mainly installed on a desk for use.

2. Related Background Art

Some boundary microphones have membrane pressure-sensitive switches that turn on or off output signals of microphone units and are mainly installed on desks for use. A boundary microphone is also referred to as a surface mount microphone, as disclosed in Japanese Unexamined Patent Application Publication No. 2008-288933, for example, since the boundary microphone is installed and used on a desk or a floor in a TV studio or a conference room. The boundary microphone, which is mainly used on a desk as disclosed in Patent Literature 1, for example, often has a low-profile flat case in which a microphone unit and necessary circuits are installed.

With reference to FIG. 6, a boundary microphone 11 primarily includes a flat metal base 10 having an open upper surface, a metal microphone cover 15 having numerous openings (sound wave inlets) and mounted on the base 10 so as to cover the upper surface of the base 10, a membrane pressure-sensitive switch 1, a male screw 12, a circuit board 18 of the boundary microphone 11, and a microphone unit 13. A microphone cord 16 and a cord bush 17 are provided in the rear portion (right end in FIG. 6) of the base 10.

The boundary microphone 11 may have a switch section to allow a user to turn on or off the output signal of the microphone unit 13, the switch section including a push switch of any type, such as a membrane, capacitance, or mechanical switch. A click-on/off pushbutton switch generates vibration on operation thereof, thus vibrating a microphone main body and causing vibration noise. As shown in FIG. 6, the boundary microphone 11 thus employs the membrane pressure-sensitive switch 1 to turn on or off the output signal since the operation noise hardly impacts audio signals during operation of the microphone.

With reference to FIG. 7, the membrane pressure-sensitive switch 1 is generally composed of a membrane 4 that yields to pressure of a user, a circuit board 2 provided with an electrode pattern 5 that detects electrical conductivity, and a spacer 3 interposed between the membrane 4 and the circuit board 2. The membrane 4 is pressed to come in contact with the electrode pattern 5, and thus to turn on the membrane pressure-sensitive switch 1. The membrane 4 is released to turn off the membrane pressure-sensitive switch 1. However, the electrode pattern 5 that detects conductivity with a copper foil is disposed on the circuit board 2 of the membrane pressure-sensitive switch 1 so as to face the membrane 4. The electrode pattern 5 is composed of two interdigital electrodes, as shown in FIG. 8, i.e., an electrode 5A and another electrode 5B. Thus, the electrode pattern 5, which is not generally connected with the copper foil in an off state, as shown in FIG. 7, is exposed to the space defined by the membrane 4, the circuit board 2, and the spacer 3. The electrode pattern 5 thus exhibits an effect similar to an antenna and is very vulnerable to external electromagnetic waves. Furthermore, the spacer 3 is generally composed of an organic resin material, which allows electromagnetic waves to permeate. Accordingly, the boundary microphone having such a configuration is readily affected by electromagnetic waves from cellular phones and other device, and thus may malfunction or generate noise.

SUMMARY OF THE INVENTION

An object of the present invention is to provide a boundary microphone that shields a membrane pressure-sensitive switch from external electromagnetic waves from cellular phones and any other device and that prevents a boundary microphone main body from malfunctioning or generating noise due to an impact of electromagnetic waves.

The present invention provides a boundary microphone including a base; a microphone unit installed in the base and converting sound into an electrical signal; a membrane pressure-sensitive switch turning on/off the output signal of the microphone unit. The membrane pressure-sensitive switch includes a circuit board provided with an electrode pattern detecting electrical conductivity; a membrane having a conductive surface; and a spacer interposed between the membrane and the circuit board. The electrode pattern is surrounded by a ground pattern on the front surface of the circuit board. The ground pattern on the front surface is connected to another ground pattern on the rear surface of the circuit board. The spacer is composed of a conductive material. The conductive surface of the membrane, the ground pattern on the front surface of the circuit board, and the spacer are electrically conducted. The electrode pattern is disposed between the conductive surface of the membrane and the other ground pattern on the rear surface of the circuit board.

According to the present invention, the electrode pattern is shielded from external electromagnetic waves, and the membrane pressure-sensitive switch is protected from an impact of external electromagnetic waves from cellular phones and any other device. Thereby, the boundary microphone can be provided that does not malfunction or generate noise due to an impact of electromagnetic waves.

DESCRIPTION OF THE PREFERRED EMBODIMENTS

Figure 6:
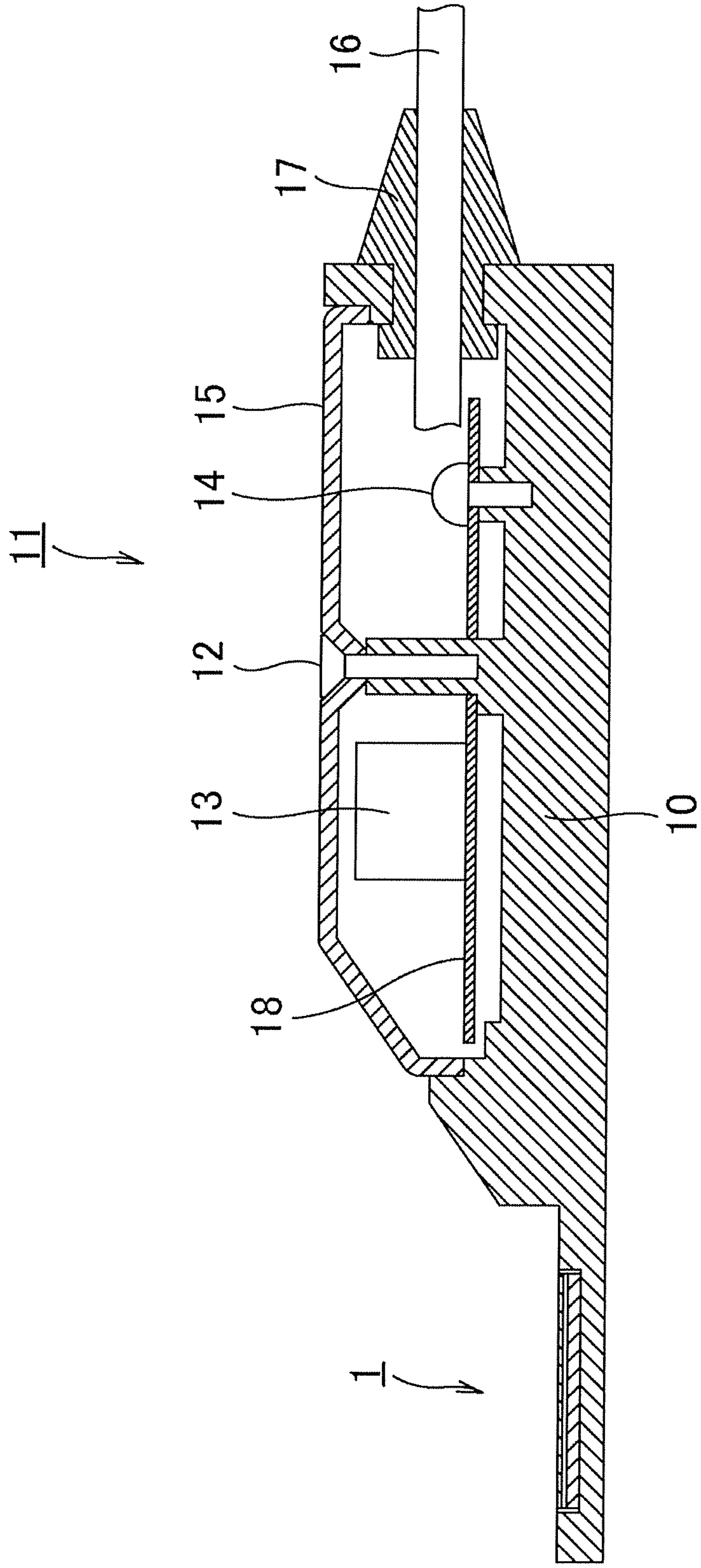
FIG. 6 is a cross-sectional view of a conventional boundary microphone.

An embodiment of a boundary microphone according to the present invention is explained below with reference to the attached drawings. A configuration characteristic to the boundary microphone according to the present invention lies in a configuration of a membrane pressure-sensitive switch. The configuration of a main body may be identical to that of a conventional main body shown in FIG. 6. Thus, the configuration of the main body of the boundary microphone is explained with reference to FIG. 6.

A boundary microphone 11 primarily includes a flat metal base 10 having an open upper surface, a metal microphone cover 15 having numerous openings (sound wave inlets) and mounted on the base 10 so as to cover the upper surface of the base 10, a membrane pressure-sensitive switch 1 provided in the front of the base 10, a male screw 12, a circuit board 18 of the boundary microphone 11, and a microphone unit 13. A microphone cord 16 and a cord bush 17 are provided in the rear (right end in FIG. 6) of the base 10. The circuit board 18 is fixed inside the boundary microphone 11 with a screw 14. The membrane pressure-sensitive switch 1 may be provided in an appropriate position other than the front of the base 10.

The boundary microphone 11 may have an appropriate shape and configuration according to the design concept of the boundary microphone 11. For instance, the base 10 and the microphone cover 15 may have substantially a rectangular planar shape, and the boundary microphone main body composed of these components may also have substantially a rectangular planar shape. The base 10 may have an appropriate planar shape, which may be a rectangular shape or a triangular shape. The base 10 is generally composed of die cast zinc, but may be composed of press-molded metal. Furthermore, the microphone cover 15 is generally composed of a punching plate (perforated plate), which is a steel plate with numerous punched holes. A mesh plate may be used instead of the punching plate. For the boundary microphone 11, a condenser microphone unit having an impedance converter is generally used as a microphone unit 13, and the circuit board 18 is provided with a tone control circuit and an audio output circuit (not shown in the drawing). One end of the microphone cord 16 is connected to the circuit board 18. The other end of the microphone cord 16 extends outward from the base 10 through the cord bush 17. In the case of a wireless microphone, an antenna as a transmitter is provided in the microphone case 1. Alternatively, a light-emitting diode is provided for an optical wireless microphone.

Figure 1:
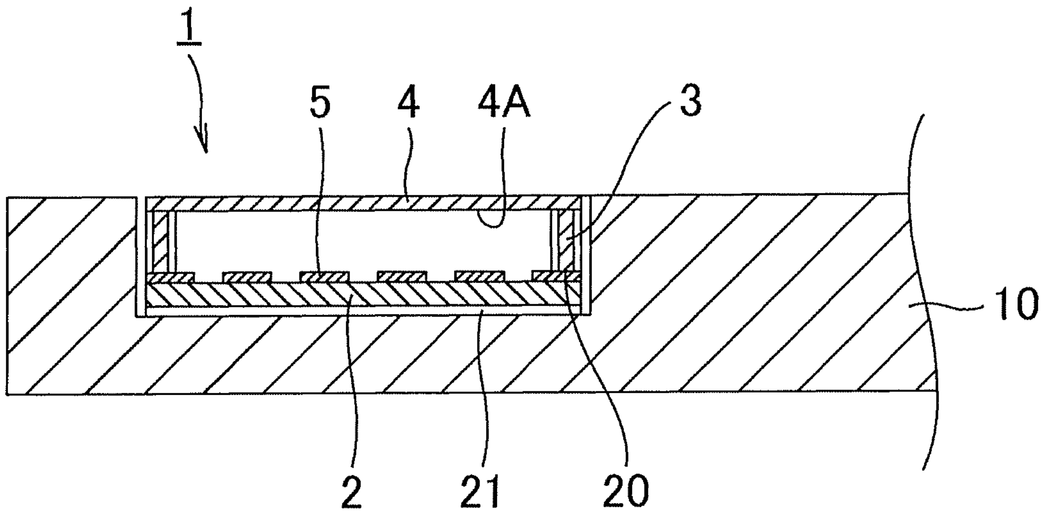
FIG. 1 is a cross-sectional view illustrating a membrane pressure-sensitive switch of a boundary microphone according to an embodiment of the present invention.

An exemplary membrane pressure-sensitive switch 1, which is characteristic to the present invention, is explained below. With reference to FIG. 1, the membrane pressure-sensitive switch 1 is composed of a membrane 4 having a conductive membrane 4A, such as a copper foil, adjacent to a front surface of a circuit board 2 and yielding to pressure of a user; the circuit board 2 provided with an electrode pattern 5 that detects electrical conductivity; and a spacer 3 interposed between the membrane 4 and the circuit board 2. The membrane 4 is bonded to the conductive spacer 3 in any manner so as to cover the front surface of the circuit board 2. The spacer 3 is bonded to a ground pattern 20 on the front surface of the circuit board 2. The electrode pattern 5 is disposed inside the conductive spacer 3 in a radial direction. The electrode pattern 5 is surrounded by the ground pattern 20 on the front surface of the circuit board 2. The ground pattern 20 on the front surface is electrically conducted to a ground pattern 21 on the rear surface of the circuit board 2. Specifically, the electrode pattern 5 that detects conductivity with a copper foil is provided on the circuit board 2 of the membrane pressure-sensitive switch 1 so as to face the membrane 4. The spacer 3 is composed of a conductive material. The conductive membrane 4A, the ground pattern 20 on the front surface of the circuit board 2, and the spacer 3 are electrically conducted. The electrode pattern 5 is disposed between the conductive membrane 4A and the ground pattern 21 on the rear surface of the circuit board 2.

The conductive membrane 4A of the membrane pressure-sensitive switch 1, the ground pattern 20 on the front surface of the circuit board 2, and the conductive spacer 3 are electrically conducted; and the electrode pattern 5 is disposed between the conductive membrane 4A and the ground pattern 21 on the rear surface of the circuit board 2. The electrode pattern 5, which is surrounded by the conductive elements, is thus shielded from external electromagnetic waves, and the membrane pressure-sensitive switch 1 is protected from an impact of external electromagnetic waves from cellular phones and any other device. Thereby, the boundary microphone 11 can be provided that does not malfunction or generate noise due to an impact of electromagnetic waves. A decorative sheet composed of vinyl chloride may be provided on the upper surface of the membrane 4.

Figure 3:
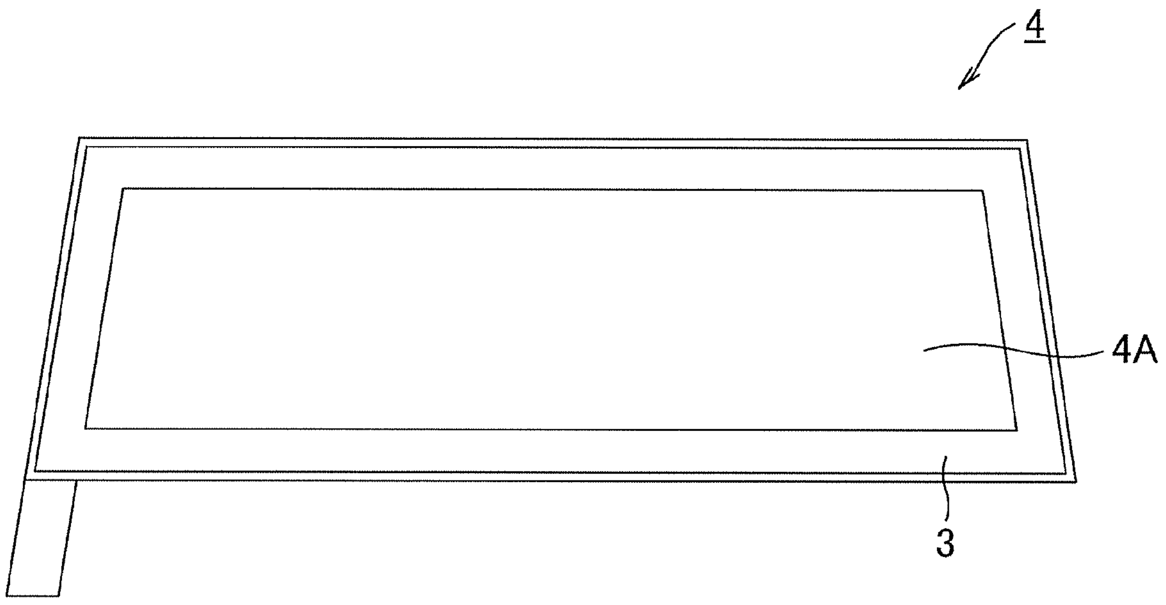
FIG. 3 illustrates a surface of a membrane and a spacer adjacent to the circuit board of the membrane pressure-sensitive switch.

With reference to FIG. 3, the membrane 4 has substantially a planar trapezoidal shape. The membrane 4 has a conductive membrane composed of a copper foil having substantially a trapezoidal shape on the front surface of the circuit board 2. The spacer 3 is composed of a conductive material having a shape of a substantially trapezoidal window frame. The spacer 3 and the conductive membrane of the membrane 4 are bonded by any means. The conductive spacer 3 is composed of a conductive double-sided tape. The conductive spacer 3 has a thickness of approximately 0.2 mm to 0.3 mm, for example, in the embodiment. The conductive spacer 3 can be composed only of the conducive double-sided tape if processable, but may have any other configuration. The conductive double-sided tape is generally provided by applying a conductive adhesive mixed with metal powder on two sides of a metal foil or conductive cloth into an intended thickness. The conductive spacer 3 may be composed of any conductive double-sided tape, including, for example, T-222 manufactured by ESD EMI Engineering Corporation. Furthermore, the membrane 4, the conductive spacer 3, and the circuit board 2 may have any other planar shape, such as an oval shape. The membrane 4 is not limited to the configuration described above. The membrane 4 only has to have a conductive surface, and may be composed only of a conductive cloth.

Figure 2B:
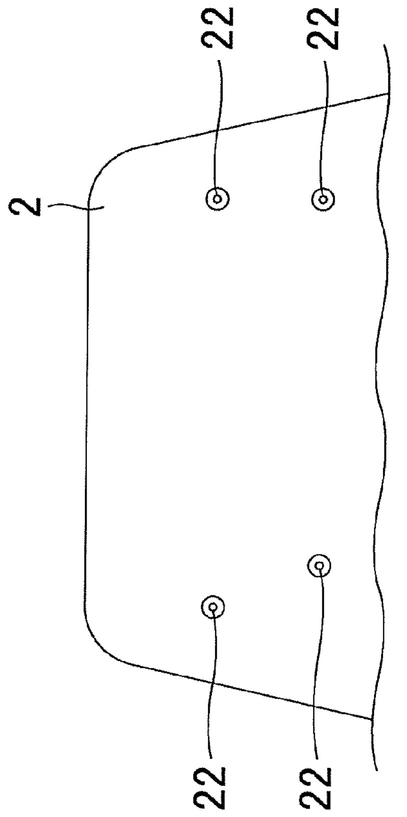
FIG. 2B illustrates the rear surface of the circuit board of the membrane pressure-sensitive switch.
Figure 2A:
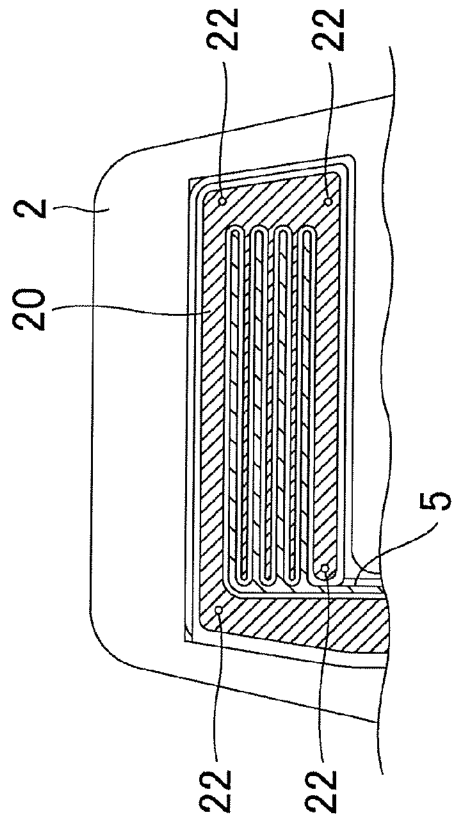
FIG. 2A illustrates the front surface of the circuit board of the membrane pressure-sensitive switch.

In FIG. 2A, the circuit board 2 of the membrane pressure-sensitive switch 1 is a printed board. The circuit board 2 may be composed of any material, including a flexible printed board. The electrode pattern 5 is surrounded by the ground pattern 20 on the front surface of the circuit board 2. As shown in the drawing, the electrode pattern 5 includes two interdigital electrodes, i.e., an electrode 5 and a ground pattern 20. The membrane 4 is pressed toward the electrode pattern 5 of the circuit board 2 of the membrane pressure-sensitive switch 1, and then the membrane 4 comes in contact with the electrode pattern 5 and the ground pattern 20 to turn on the membrane pressure-sensitive switch 1 by establishing electrical connection between the electrode pattern 5 and the ground pattern 20. In FIG. 2B, a hole 22 is provided in the ground pattern 20, which is electrically conducted to the rear surface by through-hole plating, and then electrically connected to the ground pattern 21 on the rear surface in FIG. 1. The ground pattern 20 on the front surface and the ground pattern 21 on the rear surface may be connected in any manner other than the through-hole plating.

The conductive spacer 3 may be formed into a window frame in any method, such as, for example, punching out of the spacer 3 using a press or by lithography. Furthermore, a self-holding circuit may be provided so as to allow the membrane pressure-sensitive switch 1 to remain on after it is turned on and even a hand is removed therefrom until it is turned off or a predetermined condition is met.

Figure 4:
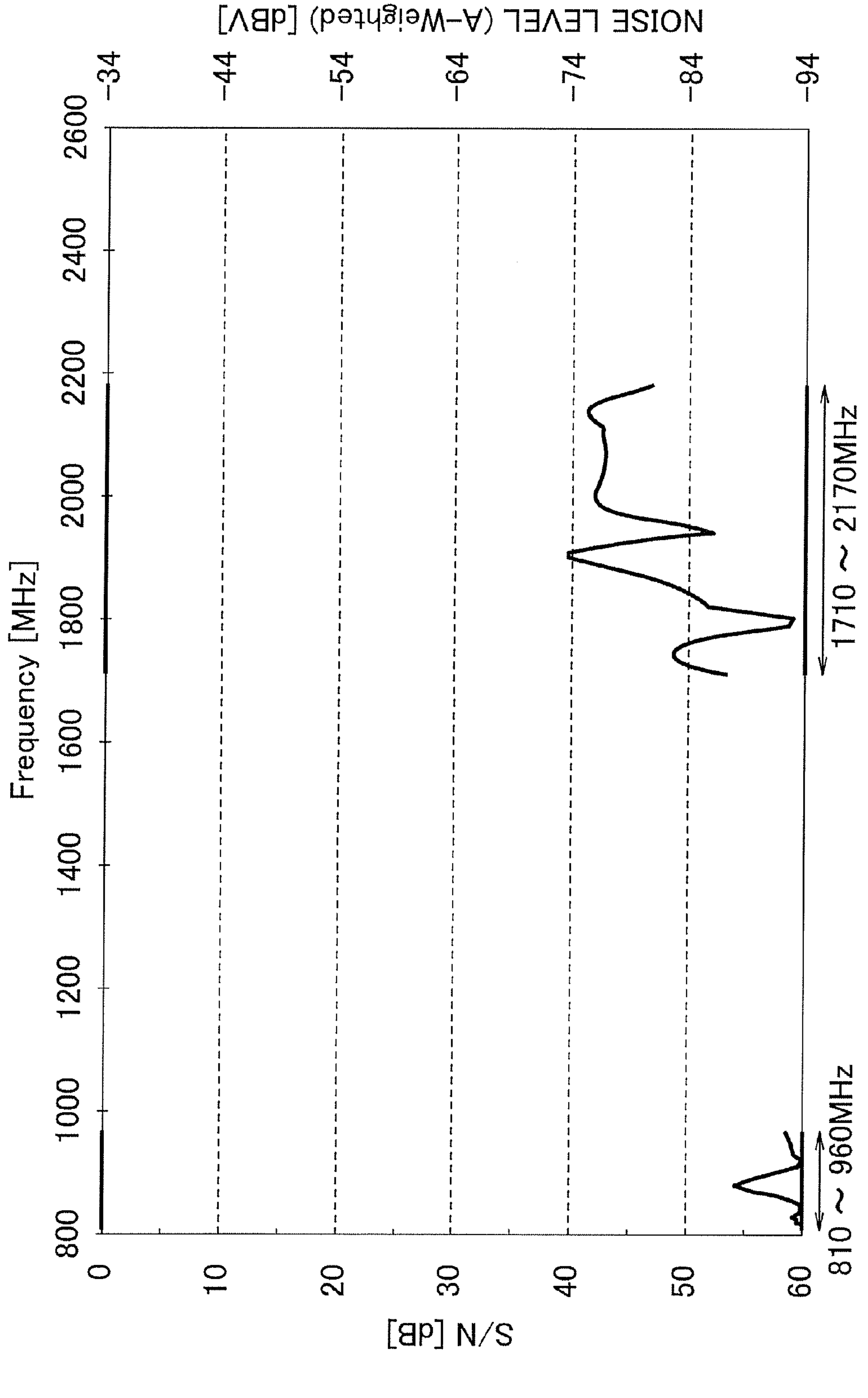
FIG. 4 is a graph illustrating results of effects of electromagnetic waves on the boundary microphone according to an embodiment of the present invention.
Figure 5:
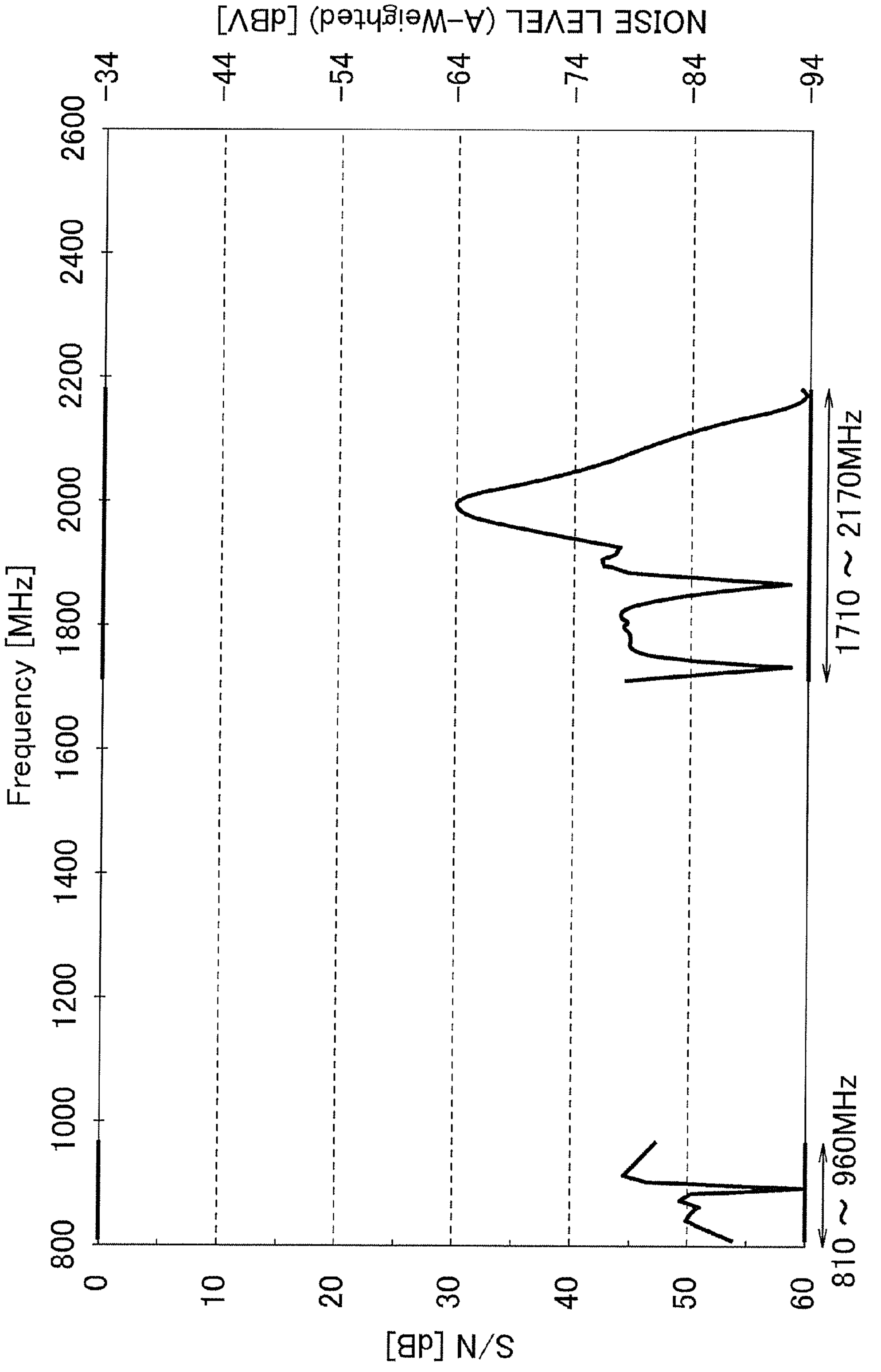
FIG. 5 is a graph illustrating results of effects of electromagnetic waves on a conventional boundary microphone as a comparative example.
Figure 7:
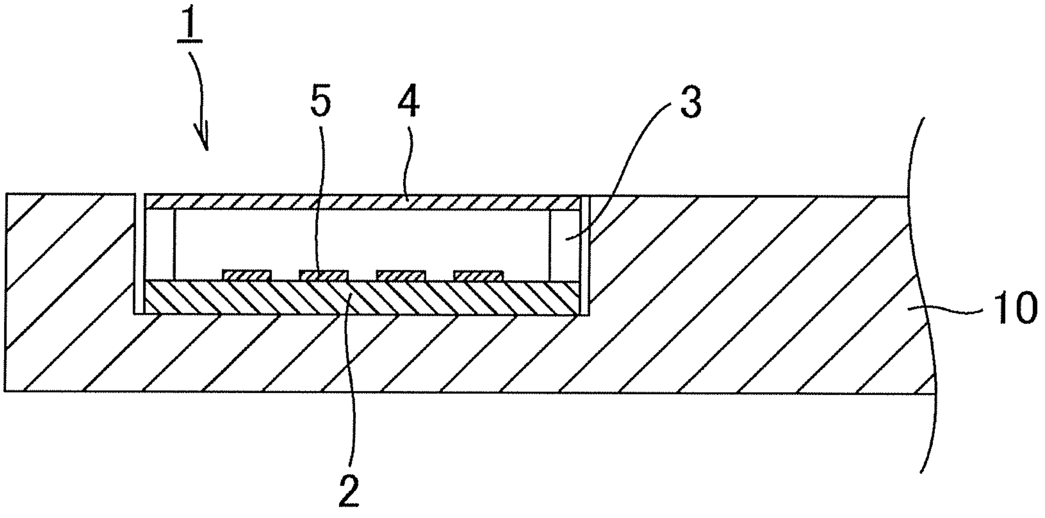
FIG. 7 is a cross-sectional view of a membrane pressure-sensitive switch of a conventional boundary microphone.
Figure 8:
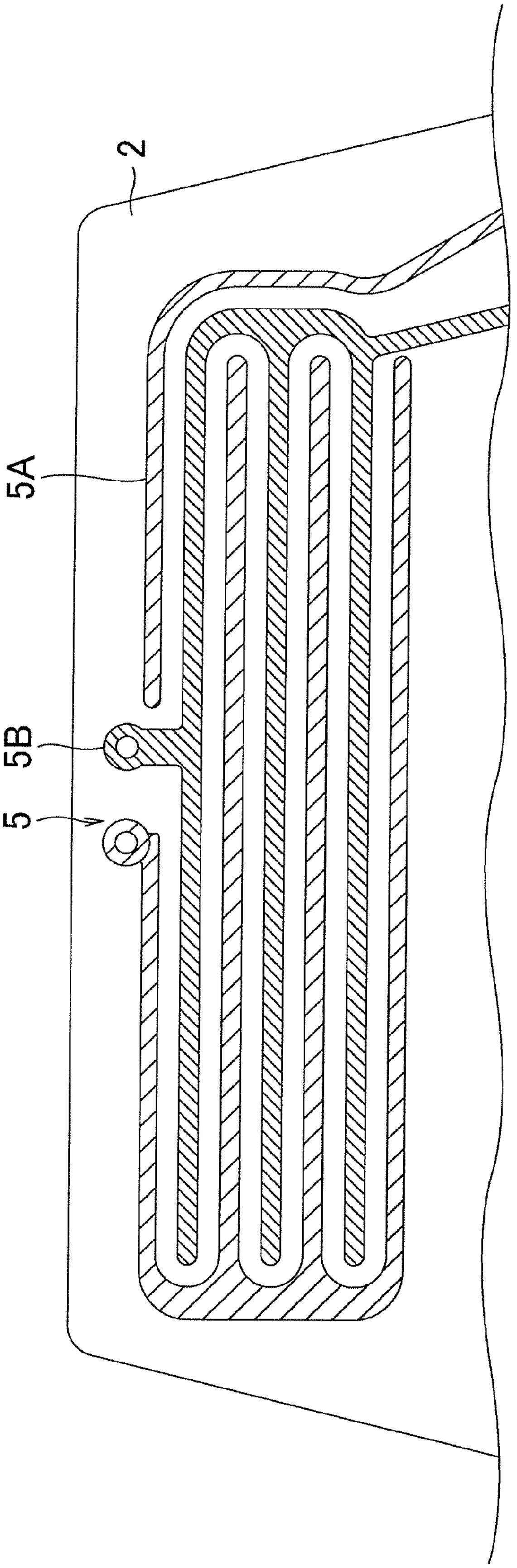
FIG. 8 illustrates a front surface of a circuit board of a membrane pressure-sensitive switch of a conventional boundary microphone.

FIGS. 4 and 5 illustrate experimental results of the effects of electromagnetic waves on the boundary microphone having the membrane pressure-sensitive switch 1 according to the embodiment of the present invention illustrated in FIGS. 1 through 3 and on a boundary microphone having a conventional membrane pressure-sensitive switch illustrated in FIGS. 7 and 8 as a comparative example. In FIGS. 4 and 5, the horizontal axis represents a frequency range (MHz); the right vertical axis represents a noise level (dBV); and the left vertical axis represents an S/N ratio (dB) of microphone sensitivity to noise level.

The experiments were conducted as below. A standard output generator (Agilent Technologies N518A), a wide-range power amplifier (Elena Electronics EA2500-20IL), and a G-TEM cell (Elena Electronics EGT-200) were connected. Electromagnetic waves AM-modulated at 1 kHz were output from the wide-range power amplifier (Elena Electronics EA2500-20IL) to the G-TEM cell while the output was adjusted such that the intensity of the electric field was 50 V/m. Subsequently, the frequency range of the modulated waves was varied from 800 MHz to 2.5 GHz every 10 MHz. Then, the output was recorded of the boundary microphone according to the embodiment of the present invention and the conventional boundary microphone as the comparative example, both installed in the G-TEM cell.

In comparison of the graphs of FIGS. 4 and 5, the noise level of the boundary microphone according to the present invention was reduced compared with the conventional microphone in the frequency ranges of electromagnetic waves of cellular phones, i.e., 810 MHz to 960 MHz and 1,710 MHz to 2,170 MHz. More specifically, the boundary microphone of the present invention demonstrated a reduction in the noise level and an improvement in the S/N ratio compared with the conventional boundary microphone by approximately 15 dB (V) in the frequency range of 810 MHz to 960 MHz and approximately 12 dB (V) in the frequency range of 1,710 MHz to 2,170 MHz. It was thus demonstrated that the boundary microphone having the membrane pressure-sensitive switch 1 according to the present invention was able to prevent the noise affected by electromagnetic waves from cellular phones and any other device, compared with the boundary microphone having the conventional membrane pressure-sensitive switch.

Although an exemplary embodiment of the present invention was explained above, the present invention should not be limited to the embodiment. For instance, the membrane pressure-sensitive switch of the boundary microphone according to the present invention is not limited to application to a boundary microphone, but may be applied to a microphone with a speaker used on a desk.

What is claimed is:

1. A boundary microphone comprising:

a base;

a microphone unit installed in the base and converting sound into an electrical signal; and a membrane pressure-sensitive switch turning on/off the output signal of the microphone unit, the membrane pressure-sensitive switch comprising:

a circuit board provided with an electrode pattern detecting electrical conductivity;

a membrane having a conductive surface; and a spacer interposed between the membrane and the circuit board, wherein the electrode pattern on a front surface of the circuit board is surrounded by a first ground pattern on the front surface of the circuit board, wherein the first ground pattern on the front surface is connected to a second ground pattern on a rear surface of the circuit board, wherein the spacer comprises a conductive material, wherein the conductive surface of the membrane, the first ground pattern on the front surface of the circuit board, and the spacer are electrically conducted, and wherein the electrode pattern is disposed between the conductive surface of the membrane and the second ground pattern on the rear surface of the circuit board.

2. The boundary microphone according to claim 1, wherein the conductive surface of the membrane comprises a conductive membrane adjacent to the front surface of the circuit board.

3. The boundary microphone according to claim 1, wherein the conductive spacer has a window frame shape and the electrode pattern is disposed inside the conductive spacer in a radial direction.

4. The boundary microphone according to claim 1, wherein the first ground pattern on the front surface is connected to the second ground pattern on the rear surface by through-hole plating.

5. The boundary microphone according to claim 1, wherein the electrode pattern and the first ground pattern on the front surface are formed into an interdigital shape.

6. The boundary microphone according to claim 1, wherein the conductive spacer comprises a conductive double-sided tape.

* * * * *